United States Patent
Kanevsky et al.

(10) Patent No.: US 8,655,644 B2
(45) Date of Patent: Feb. 18, 2014

(54) LANGUAGE TRANSLATION IN AN ENVIRONMENT ASSOCIATED WITH A VIRTUAL APPLICATION

(75) Inventors: Dimitri Kanevsky, Ossining, NY (US); Clifford Alan Pickover, Yorktown Heights, NY (US); Bhuvana Ramabhadran, Mount Kisco, NY (US); Irina Rish, Rye Brook, NY (US)

(73) Assignee: International Business Machines Corporation, Armonk, NY (US)

(*) Notice: Subject to any disclaimer, the term of this patent is extended or adjusted under 35 U.S.C. 154(b) by 633 days.

(21) Appl. No.: 12/570,665

(22) Filed: Sep. 30, 2009

(65) Prior Publication Data

US 2011/0077934 A1    Mar. 31, 2011

(51) Int. Cl.
*G06F 17/28* (2006.01)
(52) U.S. Cl.
USPC ............................................................ 704/3
(58) Field of Classification Search
USPC .......................................... 704/3, 270.1, 271
See application file for complete search history.

(56) References Cited

U.S. PATENT DOCUMENTS

| | | | |
|---|---|---|---|
| 5,490,061 A * | 2/1996 | Tolin et al. ........................ | 704/2 |
| 5,987,401 A | 11/1999 | Trudeau | |
| 6,161,082 A | 12/2000 | Goldberg et al. | |
| 6,463,404 B1 * | 10/2002 | Appleby ............................ | 704/9 |
| 6,629,087 B1 | 9/2003 | Benson et al. | |
| 7,031,906 B2 | 4/2006 | Shimohata et al. | |
| 7,239,998 B2 | 7/2007 | Xun | |
| 2001/0029455 A1 * | 10/2001 | Chin et al. .................... | 704/277 |
| 2002/0069067 A1 * | 6/2002 | Klinefelter et al. ........ | 704/270.1 |
| 2004/0078204 A1 * | 4/2004 | Segond et al. ................ | 704/277 |
| 2004/0133417 A1 | 7/2004 | Azuma | |
| 2005/0010421 A1 * | 1/2005 | Watanabe et al. ............. | 704/277 |
| 2008/0040095 A1 * | 2/2008 | Sinha et al. ....................... | 704/2 |
| 2008/0221864 A1 * | 9/2008 | Blumenthal ..................... | 704/4 |
| 2008/0221892 A1 * | 9/2008 | Nathan et al. ................. | 704/257 |
| 2008/0222295 A1 * | 9/2008 | Robinson et al. ............. | 709/227 |
| 2009/0024595 A1 * | 1/2009 | Chen ................................. | 707/4 |
| 2009/0058860 A1 | 3/2009 | Fong et al. | |

OTHER PUBLICATIONS

Qin Jin, "Design of a Virtual Community Based Interactive Learning Environment," Elsevier Science, Information Sciences, Jan. 2002, pp. 171-191, vol. 140, Issue 1.
R. Want et al., "Bridging Physical and Virtual Worlds with Electronic Tags," ACM, Proceedings of CHI '99, Apr. 1999, pp. 1-8.

* cited by examiner

*Primary Examiner* — Jakieda Jackson
(74) *Attorney, Agent, or Firm* — Vazken Alexanian; Ryan, Mason & Lewis, LLP

(57) ABSTRACT

Methods and apparatus for language translation in a computing environment associated with a virtual application are presented. For example, a method for providing language translation includes determining languages of a user and a correspondent; determining one or more sequences of translators; determining a selected sequence of selected translators from the one or more sequences of the translators; requesting a change in virtual locations, within the computing environment associated with the virtual application, of one or more selected translator virtual representations of the selected translators to a virtual meeting location within the computing environment associated with the virtual application; and changing virtual locations of the one or more selected translator virtual representations to the virtual meeting location. One or more of determining languages, determining one or more sequences, determining a selected sequence, requesting a change in virtual locations, and changing virtual locations occur on a processor device.

23 Claims, 4 Drawing Sheets

LANGUAGE TRANSLATION IN AN ENVIRONMENT ASSOCIATED WITH A VIRTUAL APPLICATION

FIELD OF THE INVENTION

The present invention relates generally to language translation, and more particularly the invention relates to language translation within an environment associated with a virtual application.

BACKGROUND OF THE INVENTION

A virtual universe or virtual world is a computer-based simulation environment where virtual universe users are intended to inhabit and interact via avatars. A virtual universe user accesses a computer-simulated universe which presents perceptual stimuli to the virtual universe user, who in turn can manipulate elements of the modeled universe or world and thus experiences telepresence to a certain degree. Such modeled universes or worlds may appear similar to the real world or instead may depict fantasy worlds. Virtual universes are not limited to games but can encompass computer conferencing, text based chat rooms and collaborative business applications.

Chat sessions and chat messages are a common method of communication within a virtual universe. Users of virtual universes are diverse; many do not speak, write or otherwise communicate in a common language but are fluent in different languages. Consequently, there are users of virtual universes that are unable to chat or communicate in a common language. Communications within a virtual universe are further hindered because chat messages frequently contain idioms and abbreviated speech that may be difficult or impossible to translate, or translate accurately, via traditional machine translation methods. Moreover, translators may not exist for between all pairs of languages and all pairs of dialects.

SUMMARY OF THE INVENTION

Principles of the invention provide, for example, methods and apparatus for language translation in a computing environment associated with a virtual application. For example, in accordance with one aspect of the invention, a method for language translation in a computing environment associated with a virtual application is provided. The method includes determining languages of a user and a correspondent; determining one or more sequences of one or more translators; determining a selected sequence of one or more selected translators from the one or more sequences of the one or more translators; requesting a change in virtual locations, within the computing environment associated with the virtual application, of one or more selected translator virtual representations of the one or more selected translators to a virtual meeting location within the computing environment associated with the virtual application; and changing virtual locations of the one or more selected translator virtual representations to the virtual meeting location. One or more of determining languages of the user and the correspondent, determining one or more sequences, determining a selected sequence, requesting a change in virtual locations, and changing virtual locations occur on a processor device.

In accordance with yet another embodiment of the invention, apparatus for language translation in a computing environment associated with a virtual application is provided. The apparatus includes a memory and a processor coupled to the memory. The apparatus is operative or configured to perform the above method for language translation in a computing environment associated with a virtual application.

In accordance with another embodiment of the invention, a system for language translation in a computing environment associated with a virtual application is provided. The system comprises modules for implementing the above method for language translation in a computing environment associated with a virtual application.

In accordance with one more embodiment of the invention, an article of manufacture for language translation in a computing environment associated with a virtual application is provided. The article of manufacture tangibly embodies a computer readable program code which, when executed, causes the computer to carry out the above method for language translation in a computing environment associated with a virtual application.

Aspects of the invention include, for example, enabling communication between users of a computing environment associated with a virtual application when users do not speak or communicate in a common language; finding an optimum translator sequence, according to user provided criteria, for a series of translations, which may involve intermediate languages, to enable communications between users that do not communicate in a common language; and the use and teleportation of avatars, including human avatars and machine translator avatars, to facilitate translated communication in computing environment associated with a virtual application.

These and other features, objects and advantages of the present invention will become apparent from the following detailed description of illustrative embodiments thereof, which is to be read in connection with the accompanying drawings.

DETAILED DESCRIPTION OF THE INVENTION

Figure 1:
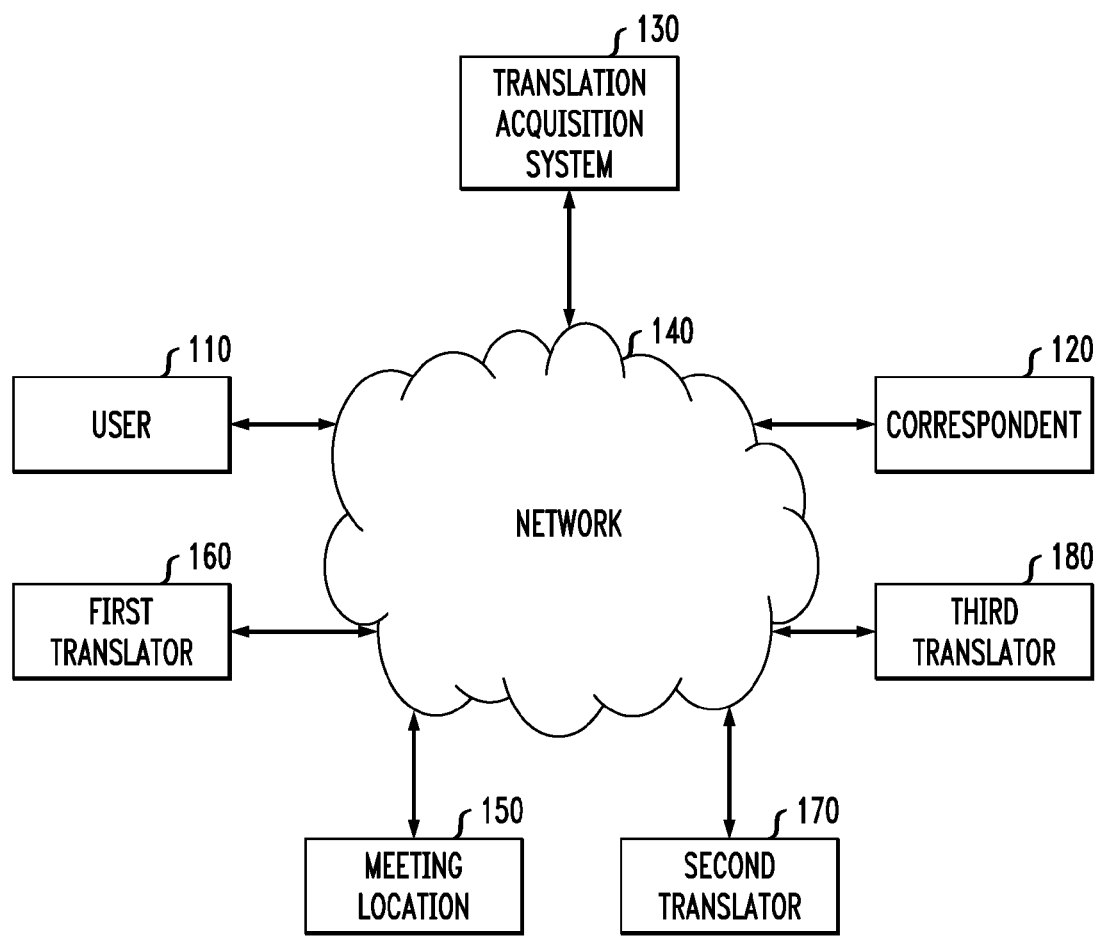
FIG. 1 illustrates a system for language translation in a virtual universe, according to an exemplary embodiment of the invention.

A virtual universe (VU) is a computing environment associated with a virtual application, that is, a computer-based simulation environment where VU residents or users are intended to traverse, inhabit and/or interact via avatars. Many, but not necessarily all, VUs are represented using three-dimensional (3-D) graphics and landscapes, and are populated by many thousands of users. The term VU and the term virtual world have the same meaning. Other terms having meanings the same as or similar to VU include metaverses and 3D Internet.

A user accesses, through a computer, a computer-simulated or modeled universe (i.e., a VU) which presents perceptual stimuli to the VU user, who in turn can manipulate elements of the modeled universe and thus experiences telepresence to a certain degree. Such modeled universes may appear similar to the real world or instead may depict fantasy worlds. Often, the VU resembles the real world such as in terms of physics, houses, and landscapes. The model universe may simulate rules based on the real world, rules of the fantasy world, or hybrid rules of real and fantasy worlds. Communication between VU users may include, but is not limited to, text, graphical icons, visual, video, sound, and forms using touch and balance senses. Communication with real-time voice communication using voice-over-Internet-protocol (VOIP) is also possible. VUs are not limited to games but can encompass computer conferencing and text based chat rooms.

Teleportation or teleport, as used herein, is transportation (e.g., virtual transportation) within a VU. For example, an avatar of a VU user may teleport to a virtual location within a VU by the virtual transportation or virtual movement of the avatar from one virtual location within the VU to another virtual location within the VU. Teleportation of an avatar comprises a change in virtual location of the avatar.

An example of teleportation is a change in virtual position of an avatar image, which is or corresponds to an avatar, from being displayed with an image of a first location, which is or corresponds to a first location within a VU, to being displayed with an image of a second location, which is or corresponds to a second location within the VU. A processor device running software changes the display from the combination of the avatar image and the image of the first location to the combination of the avatar image and the image of the second location. The change in virtual position of the avatar image is caused by the software running on the processor device.

Consider an example of a user perceiving and/or interacting with a VU by visual perception, for example, by a visual display on a display device coupled to a processor device. Virtual locations within the VU are displayed on the display device. An avatar image is also displayed on the display device and considered to be at the displayed virtual location when the avatar appears with, is displayed upon, or is superimposed upon the displayed virtual location. Software, running on the processor device, may move or change the avatar image from an image of one location, to an image of another location, for example, the avatar image is displayed upon an image of a first location at some point in time, and, at a later time, the avatar image is displayed upon an image of a second location. This change in virtual locations of the avatar image is an example of teleportation form the first virtual location to the second virtual location.

An avatar may be present at a virtual location without being displayed, for example, the avatar may have been previously last displayed at the virtual location, or the avatar is known in other ways (i.e., other than ways comprising display of the avatar, for example, by verbal or text information) to be at the virtual location. Thus, teleportation does not necessarily involve visual display of the avatar and/or display of one or more virtual locations. The change in virtual location, associated with teleportation, of the avatar may be made known by, for example, spoken words, text, or other auditory, olfactory or tactile means.

Furthermore, the placement of an avatar at a virtual location when the avatar was not known to previously have been at a location is also considered to be a change in virtual locations or teleportation.

An avatar is a representation (e.g., a virtual representation and/or a graphical representation) inside of a VU of a VU user, a translator or a correspondent. For example, the avatar can be in the form of a three-dimensional model, a two-dimensional icon or picture, or a text construct. As used herein, an avatar may be a virtual object (e.g., one or more assets) representing, within a VU, the embodiment of the VU user, translator or correspondent. An avatar often, but not always, takes the form of a cartoon-like human graphical representation. An avatar may be sensed (e.g., seen) by other VU users and/or other avatars. An avatar may be teleported within a VU. Teleportation of an avatar of a user, translator or correspondent may represent transportation of the user, translator or correspondent. An avatar in a VU is often, but not always, referred to as a resident of the VU. An avatar of a translator may be represented to indicate that the translator or translator avatar is a translator associated with one or more languages. For example, a translator avatar may be a figure dressed in garb of a country associated with the one or more languages, or have characters or symbols associated with the one or more languages or associated with a country associated with the one or more languages.

A tag, as used herein, is a label or token indicating information, for example, indicating a characteristic, a language or a constraint associated with the holder or owner of the tag. The holder or owner of the tag is, for example, an avatar of a user, correspondent or translator, or the user, correspondent or translator. Tags are often associated with avatars in a VU.

An agent is an account of a user upon which the user may build an avatar, and which is tied to an inventory of assets owned by the user within the VU.

A region is a virtual place (e.g., a virtual segment or expanse of land) within the VU. The region may typically, but not necessarily, be stored on, reside on or processed on a single compute server.

An area is a specific virtual place within a region. For example, an area may be a building or a room.

A login environment of a user are the regions and areas that are loaded (e.g., loaded by default) when the avatar of the user enters the VU.

An asset may be an item, content, media (e.g., digital media) in a VU. Assets include, but are not limited to, objects, shapes of objects, textures, digitized audio clips, avatar shape and appearance, avatar skin textures, scripts, and information written on note cards. Each asset is referenced by a Universally Unique Identifier. Assets are typically stored on a computer server or servers, for example, one or more asset servers, supporting the VU.

A Universally Unique Identifier (UUID) is an identifier, for example, an identifier according to a standard used in software construction. For example, a typical UUID is standardized by the Open Software Foundation as part of the Distributed Computing Environment. UUIDs may, for example, enable distributed systems to uniquely identify information without significant central coordination. For example, anyone can create a UUID and use it to identify something with reasonable confidence that the identifier will never be unintentionally used to identify anything else. Information or items labeled with UUIDs may, for example, be combined into a single database without needing to resolve name conflicts. UUIDs are used, for example, to identify objects or asset within a VU.

For example, assets, avatars, the environment, and anything visual may have or may consist of one or more UUIDs tied to geometric data (e.g., geometric data distributed to users as textual coordinates), textures (e.g., textures distributed to users as graphics files, such as JPEG2000 files), and effects data (e.g., effects data rendered by a client of a user according to preferences of the user and user device capabilities).

The term correspondent, as used herein, is a user of a VU that is communicating with, potentially will be in communicating with, or is desired to communicate with another user. Aspects of the invention apply, for example, to conversations or communications between a user and a correspondent user (i.e., a correspondent), for example, communications that are assisted by translations (e.g., translations by methods of the invention) between a language of the user and a language of the correspondent.

The phrase translation between the user language and the correspondent language, as used herein, means one of: (i) translation from the language of the user (i.e., the user language) and the language of the correspondent (i.e., the correspondent language); (ii) translation from the correspondent language to the user language, and (iii) translation from the user language to the correspondent language and translation form the correspondent language to the user language.

Users of VUs are diverse. Users may be fluent in different languages, thus hindering communication between users. Chat messages within a VU frequently contain idioms and abbreviated speech that may be difficult or impossible to translate, or translate accurately, via traditional machine translations. Moreover, translators may not exist for all languages and dialects. Aspects of the invention include dynamic systems and methods to facilitate language translation in VUs. For example, methods of the invention may include an automatic and efficient scan of other users to act as translators, and available translation machines (i.e., machine translator) presently in the VU. A machine translator comprises, for example, a processor and software configured to translate between languages.

As VUs become increasingly available, stable and popular, they are now regularly being used as meeting places for individuals, teams and businesses. Via VUs, a user, or an avatar of the user, may communicate with other users, or avatars of the other users, from numerous other countries. However, automated machine-translation methods or means are lacking for many languages, or automated machine-translations methods and means are not sufficiently accurate to provide real-time conversations between avatars across language barriers, especially considering idioms and typical choppy or abbreviated VU chat messages. Exemplary aspects of the invention are methods that involve automated and efficient use of other avatars and machine-translation units to facilitate both social and business transactions in a VU. Tags may be used to indicate a language of choice of a user, or the language of choice may be gleaned or made known by a scan of or monitoring of chat sessions or communications of the user.

Features of the invention may include tokens or tags associated with users and/or correspondents of a VU, for example, the tokens or tags may specify a language of choice for communication, and optionally a secondary or tertiary language of choice of the associated user. Other parameters may be specified, for example, dialect, degree of experience with a language for the user, the correspondent or a translator (e.g., desired experience of a potential translator with a language), desired speed of communication or translation, and gender of voice, or other voice attribute, for the voice of the user, the correspondent or the translator. Such tokens and tags may be stored in a database and associated with a user and his avatar. Alternatively or additionally, an automated system may intuit or determine a language a user employs for communication and language skills of the user (e.g., language quality, grammar skills, accent, dialect, degree of experience with the language, and speed of communication and quality of a language skill), with a certain degree of accuracy by monitoring words in a chat session or communication. Such monitoring may also be used to understand the degree of idiomatic or abbreviated words typically used by a user. People often chat in highly abbreviated forms that include usage such as, for example: BRB meaning be right back, IDK meaning I don't know, how R U? meaning how are you, omg! meaning oh my gosh, and BTW meaning by the way.

Embodiments of the invention may comprise a network of connected translators or translation systems, accomplished by automatic machine methods and methods that involve users and their avatars. The connected translators or translation systems may provide translation services in real-time between the user and the correspondent or their respective avatars. Note that the search for other avatars who speak other languages may proceed via a chain of friends or acquaintances of a particular avatar. A friend or acquaintance may be defined in many ways, including other avatars with which a target avatar has chatted with in the past.

Embodiments of the invention may include methods involving use of avatars, translation and/or machine-translation units to facilitate social and/or business transactions in a VU.

FIG. 1 illustrates a system 100 for language translation, according to an embodiment of the invention. System 100 provides one way or two way communications between a user 110 and another user called a correspondent 120. The system comprises a network 140 and a translation acquisition system (TAS) 130. It may further comprise any of the user 110, the correspondent 120, a first translator 160, a second translator 170, a third translator 170 and a meeting location 150.

The user 100 speaks, writes or otherwise communicates in a first language and the correspondent 120 speaks, writes or otherwise communicates in a second language different from the first language. The system 100 provides, or provides for, translation from the first language to the second language and/or from the second language to the first language, enabling communication between the user and the correspondent. The system 100 uses at least the first translator 160 to translate from the first language to the second language and/ or from the second language to the first language. The system 100 may use additional translators, such as the second translator 170 and/or the third translator 180 in executing the translation, e.g., through intermediate languages.

The system 100 uses a meeting location 150 where two or more of the avatars of the user 110, the correspondent 120, the first translator 160, the second translator 170 and the third translator 180 meet. To get to the meeting location 150, one or more of the two or more avatars attending the meeting may teleport to the meeting location 150 from whatever virtual location they were previously at.

The translation acquisition system (TAS) comprises software (e.g., software modules) and/or hardware (e.g., a processor and/or memory) to execute at least part of methods of the invention.

The network 140 may be any network coupled to the user 110, the correspond 120, at least one of the translators 160, 170 and 180. The network 140 may be, for example, the Internet, a virtual private network, a communications network, or a computer network.

The meeting location 150 is a virtual location, for example, a region or an area. Avatars may represent any of the user 110, the correspondent 120, the first translator 160, the second translator 170 and the third translator 180 at the meeting location 150. A virtual meeting may take place at the meeting location 150.

By way of example only, consider a user 110 fluent in a first language wishing to correspond to a correspondent 120 fluent in a fourth language. Three translators 160, 170 and 180 are used to translate from the first language to the fourth language using intermediate languages which are a second language and a third language. A first translator 160, understanding the first and second languages, translates the first language of the user 110 to the second language. A second translator 170, understanding the second and third languages, translates the second language to the third language. A third translator 180, understanding the third and fourth languages, then translates the third language into the fourth language understood by the correspondent 120. Using a sequence or chain of translators, comprising the first translator 160, the second translator 170 and the third translator 180, the user 110 is able to communicate to the correspondent 120. Using the sequence or chain of translators in the reverse direction the correspondent 120 is able to communicate to the user 110. The network 140 at least links the user 110 to the first translator 160, the first translator 160 to the second translator 170, the second translator 170 to the third translator 180, and the third translator 180 to the correspondent 120. The network 140 may further link the second translator 170 and the third translator 180 to the user. The network 140 may, for example, link any or all of the user 110, the correspondent 120, the translators 160, 170 and 180 to the meeting location 150 and/or to the TAS 130. It is understood that the user 110, the translators 160, 170 ad 180 and the correspondent 120 may be represented by avatars and that the translations and the links may be by and between the avatars.

Any language may be involved in translation either as a source, a destination (i.e., a language of a correspondent) or an intermediate language. Examples of such languages include, but are not limited to, spoken languages such as English, French and Spanish.

Although the system 100 illustrates use of three translators and two intermediate languages (i.e., the second and the third languages), systems and methods of the invention are not so limited but may involve any number of intermediated languages including, but not limited to, zero or one intermediate language.

Figure 2:
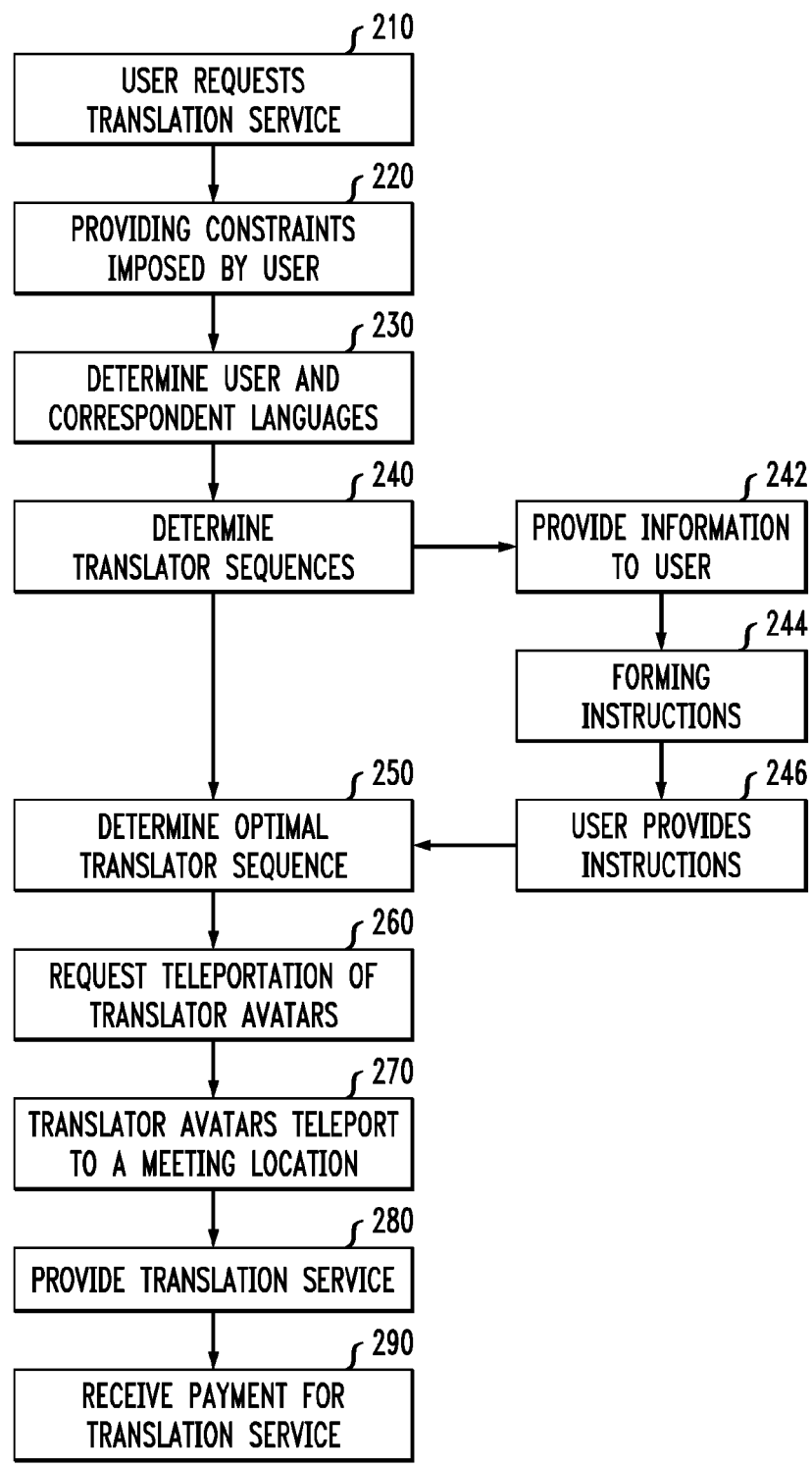
FIG. 2 illustrates a method for language translation according to an exemplary embodiment of the invention.

FIG. 2 illustrates a method 200 for language translation according to an embodiment of the invention. The method 200 may be executed by, for example, a TAS, (e.g., TAS 130). The method 200 may involve, for example, the configuration of user, correspondent, translators, meeting location and network as shown in FIG. 1.

In the first step 210, a user requests translation service. For example, the user requests the translation service in order to communicate with another user called a correspondent. The communication intended to take place within a VU and may comprise, for example, a chat session. Translation is necessary because the user wishes to communicate in a user language and expects that the correspondent will communicate in a correspondent language different from the user language.

The term language, as used herein, may include a specific dialect, a set of colloquialisms, a set of idioms, or a nomenclature. Thus, two different languages may have a usual meaning of two different languages (i.e., two different root or primary languages) as French and English are two different languages; a meaning of two different dialects of the same common language (e.g., two different dialects of the Chinese language which includes Mandarin, Wu, Cantonese, and Min dialects; or two different dialects of the English language, one commonly used in India and another commonly used in the United States); a meaning of two different colloquial languages (e.g., two different sets of colloquialisms of a common language); a meaning of or two different idiomatic languages of a common language. Furthermore, two different languages may comprise two different sets of abbreviations or two different nomenclatures of a common language.

The requesting of the translation service by the user may be represented by, or may be considered as, requesting of the translation service by a user avatar of the user. The anticipated communication between the user and the correspondent may be represented by, or may be considered as, communication between the user avatar and a correspondent avatar of the correspondent. The translation service requested may be services to be rendered by a human translator, by a machine translator or by a combination of a human translator and a machine translator. The request for the translation services is made to, for example, a TAS.

The second step 220 comprises the user providing constraints to the TAS or the TAS obtaining constraints from the user. The constraints may limit the selection of translators. For example, the constraints may request only human translators, only machine translators or allow either or both human and machine translators. Other examples of constraints may include constraints on the selection of translators, for example, gender, age, profession, location, or relationship with the user or the correspondent (e.g., friend, relative, or business relationship, acquaintance), experience, or having performed, and the performance of, past translation service for the user or for the correspondent, a voice attribute of the translator; constraints on the translation, for example, a speed of translation or communication; constraints pertaining to the user, for example, the gender of the voice of the user; time constraints, for example, times at which the communication between the user and the correspondent are to take place and time of the translation; expenditure constraints, for example, constraints on the cost, exchange or barter associated with the translation service or the translator; and translator sequence constraints, for example, the maximum number of translators comprised by a translator sequence. The user may specify constraints to be hard constraints that must be meet in the selection of translators or preferences (soft constraints) that do not necessarily have to be met.

The constraints may, for example, be provided in the form of an equation which may have weights indicating the relative importance of two or more of the constraints in the equation. For example, constraints may be expressed or provided by EQ. 1.

$$C_T = (W_1 \times C_1) + (W_2 \times C_2) + (W_N \times C_N). \qquad \text{EQ. 1}$$

$C_T$ represents an overall measure, or figure of merit, for the constraints. $C_i$ represents the individual constraints. $W_i$ represents the weight for each associated individual constraint $C_i$, and i is an index for the constraints. For example, EQ. 1 may be a binary equation where the constraints are hard constraints, or EQ. 1 may be an analog equation where the constraints are preferences.

The constraints may be comprised by, indicated by and/or provided by tokens or tags of the user avatar, for example, similar to tokens or tags related to the fourth step 240 and described below.

The correspondent and translators may also provide or impose constraints (i.e., correspondent and translator constraints, respectively) to the TAS, similar to the constraints provided by the user and provided in a similar manner (e.g., provided by the correspondent and translator avatars, respectively) and may take the form of token or tags of the correspondent or translator.

The third step 230 comprises the TAS determining the user language and the correspondent language. The user language may be determined by monitoring of communication of the user occurring within the VU, or by a user language tag of the user avatar. The user language tag is a tag, token or label associated with, or coupled to, the user avatar. The correspondent language may be determined by monitoring of communication of the correspondent occurring within the virtual universe, or by a correspondent language tag of the correspondent avatar. The correspondent language tag is a tag, token or label associated with, or coupled to, the correspondent avatar. The monitored communication may be, for example, chat sessions of the user or of the correspondent, but not necessarily chat sessions between the user and the correspondent. Monitoring of the communication may be performed by a machine such as a computing or processing device or by a human.

The user or correspondent tag may specify a language of choice, and optionally, a secondary or tertiary language of choice of the associated user or correspondent. Other parameters may additionally be specified by tags, for example, a dialect, a set of colloquialisms, a set of idioms, or a nomenclature of a language.

Such tokens and tags, as well as tokens and tags associated with the third step 230, may be stored in a database and associated with the user, correspondent or translator and the associated user, correspondent or translator avatars.

The monitoring of communication of the user or the correspondent may comprise, for example, an automated system determining a language the user or correspondent employs for communication and/or determining language skills of the user or correspondent by monitoring words, phrases or sentences in a chat session or communication. Such monitoring may also be used to determine the degree of idiomatic or abbreviated words typically used by the user or correspondent. The monitoring of communications of the user or the correspondent may comprise monitoring of communication represented as communication of the user avatar or the correspondent avatar.

The fourth step 240 comprises the TAS finding or determining one or more translator sequences (i.e., sequences of one or more translators) for translation between the user language and the correspondent language. Ideally, a single translator translates between the user language and the correspondent language. In this case, a translator sequence includes only the single translator performing a translation directly between the user language and the correspondent language, and, in the fourth step 240, the TAS may determine only one single translator (i.e., a single translator sequence), or may determine more than one single translators (i.e., more than one translator sequences) that could be used to translate between the languages of the user and correspondent.

Alternately, more than one translator may be necessary or desirable to translate between the languages of the user and the correspondent. As described above with respect to system 100 and FIG. 1, a qualified single translator capable of translating between the languages of the user and the correspondent may not be available, and translation into intermediate languages may be necessary or desirable. In this case, a sequence of translators is a series of two or more translators. A first translator translates between the user language and an intermediate language, and a final translator translates between an intermediate language and the correspondent language. There may be only one intermediate language, or there may be more than one intermediate language with a translator translating between one intermediate language and another intermediate language. The number of translators ($N_T$) in a translator sequence equals one plus the number of intermediate languages ($N_{IL}$), that is, $N_T=1+N_{IL}$ (EQ. 2). For the case of more than one translators, in the fourth step 140, the TAS may determine only one sequence of multiple translators (i.e., a single translator sequence) or may determine more than one sequence of multiple translators (i.e., more than one translator sequences) that could be used to translate between the languages of the user and correspondent.

The determination of the one or more translator sequences may, or may not, be according to, take into account or be limited by the constraints provided in the second step 220.

Determining or finding the one or more translator sequences may, for example, comprise the TAS searching for translators from a pool of translators. The pool may comprise, for example, a database of translators, or acquaintances of the user or the user avatar. The acquaintances may comprise, for example, a chain of acquaintances, that is, an acquaintance of an acquaintance and so forth. An acquaintance may be, for example, a friend, a professional contact, a social contact or a business contact. The database of translators may comprise, for example, a database of human translators and a database of machine translators.

Translators, and/or translator avatars, may have a profile that indicates, for example, that the translators are willing to provide translation services, if a fee or barter for the service is required, what the required fee or barter for the service comprises, characteristics of the translator (e.g., age, gender, language capabilities and professional qualifications) and/or translator imposed constraints on the services (e.g., times of availability). The profile may, for example, be stored in the database of translators or may be indicated by tags of the translator avatars.

The fifth step 250 comprises determining a selected (e.g., an optimal) translator sequence. Out of all the found, identified or determined translator sequences resulting from the fourth step 240, one translator sequence is determined to be optimal for translation between the languages of the user and the correspondent.

Determining the optimal translator sequence may comprise determining which one or more of the translator sequences meet all of the constraints imposed by the user. Translator sequences meeting all of the constraints are called fulfilling sequences. If there is more than one fulfilling sequence, the optimal translator sequence is determined by some criteria, which may, or may not, be a random selection among the fulfilling sequences.

In the case where all the constraints are not met by at least one translator sequences, or in the case where the user requirements are preferences as opposed to hard requirements, determining the optimal translator sequence may comprise determining which one or more of the translator sequences best meet the constraints imposed by the user. Translator sequences best meeting all of the constraints are called best sequences. There will be more than one best sequence only when more than one of the sequences equally meets the constraints. If there is more than one best sequence, the optimal translator sequence is determined by some criteria, which may, or may not, be a random selection among the best sequences.

Determining the optimal translator sequence is according to, takes into account or is limited by the constraints provided in the second step 220. Optionally, $C_T$ from EQ. 1 may be used as a figure of merit for determining the optimal translator sequence. In this case, EQ. 1 may be evaluated for each translator sequence determined in the fourth step 240. The one or more translator sequences having the highest value of $C_T$ are one or more translator sequences that are also either fulfilling sequences or best sequences.

An important limitation, which may be a user constraint or may be a default limitation of an embodiment of the invention, is requiring a minimal translator sequence for the determination of the optimal translator sequence. In this case, the optimal translator sequence may be, for example, one of the translator sequences having a minimal number of translators and translations, or alternately, after meeting one or more user constraints, the optimal translator sequence is one of the remaining translator sequences having a minimal number of translators or translations. In one embodiment, the fifth step 250 includes determining a number of translators or translations required by each of the one or more translator sequences, and determining the optimal translator sequence according to the number of translators required by each of the one or more sequences, for example, choosing the translator sequence having the minimum number of translators, or the minimum number of translators after after meeting one or more user constraints.

Alternate or additional criteria, other than the minimal number of translators, may be used to define what constitutes a minimal or a selected translator sequence. A minimal or selected translator sequence may be defined by one or more of: i) the minimal number of translators or translations, ii) the least expensive translator sequence; and iii) the most accurate translator sequence; iv) the translator sequence having the fastest projected time for translation; and v) a combination of any of the minimal number of translators, the least expensive translator sequence, the most accurate translator sequence and the translator sequence having the fastest projected time. The combination may be a weighed combination. In one embodiment, the fifth step 250 includes determining an indicator for each translator sequence of the one or more translator sequences, and determining the optimal translator sequence according to the indicator for the each translator sequence. The indicator for each translator sequence comprises a measure of at least one of: i) a number of translators or translations required for the translator sequence, ii) an expense associated with use of the translator sequence, iii) an accuracy of translation for the translator sequence, and iv) a projected translation time for the translator sequence. The indicator may be a composite measure for more than one of measures associated with i) through iv) above. The composite measure may comprise weights associated with the measures associated with i) through iv) above.

A cost of translation, a translation accuracy indicator, and a translation time factor may be associated with each translation of a translator sequence. For example, the cost of translation, the translation accuracy indicator, the translation time factor of a translation, and a speed of translation may be associated with a translator and obtained from the database of translators and/or tags of the translator avatar. A determination of a minimal translator sequence may be according to one or more of the cost of translation, the translation accuracy indicator, and the translation time factor of a translation for each translation of the possible translator sequences.

Therefore, the fifth step of determining an optimal translator sequence may include one or more of: (i) determining a number of translators required by each of the determined one or more translator sequences found in the fourth step 240 (determined translator sequences), and determining the selected sequence according to the number of translators required by each of the determined translator sequences in order to minimize a number of translators in the selected sequence; (ii) determining an expense associated with each of the determined translator sequences, and determining the selected sequence according to the expense associated with each of the determined translator sequences in order to minimize an expense of the selected sequence; and (iii) determining an accuracy of translation associated with each of the determined translator sequences, and determining the selected sequence according to the accuracy of translation of each of the determined translator sequences in order to maximize an accuracy of translation of the selected sequence.

Consider the following example for translation between a user language and a correspondent language. Based on translation resources available, a TAS computes possible translator sequences (herein termed paths) (e.g., from shortest to longest translator sequence) based on a number of translators (herein termed hops) or translations required. A router module (e.g., a sequence determination module), comprising a routing algorithm for selecting the sequence of translators, is used to compute or project routing information comprising: i) a number of translators or translations required for each of the translator sequence, the potential optimal translation sequence, a first next optimal translation sequence (e.g., a first fallback translator sequence), and a second next optimal sequence (e.g., a second fallback translator sequence). The routing information is computed for each of human only, machine only and a combination of human and machine translators. All possible translator sequences may, or may not be, computed depending upon user or other constraints. Higher priority may be given to single-hop paths or sequences over multi-hop paths or sequences.

In one embodiment for this example, comprising a first optional step 242, a second optional step 244 and a third optional step 246, the user provides feedback to the TAS for the selection of the translator sequence or route. The routing information, and optionally, information pertaining to the translators, is provided to the user by the TAS in the first optional step 242. The provided routing information may comprise, for example, routing information for each of human only, machine only and a combination of human and machine translators. In the second optional step 244, the user then forms instruction (e.g., directions or preferences) for the selection of the optimal translator sequence to be implemented, and, in the third optional step 246 the user provides the instructions to the TAS. The selection may be, for example, selected from the potential optimal, the first next optimal and the second next optimal for each of human only, machine only and a combination of human and machine translators. For example, the user, after reviewing the routing information, and, optionally, information pertaining to the translators, provides the TAS instructions to select the potential optimal translator sequence having machine translators only to be the optimal translator sequence. The TAS then determines the optimal sequence according to the instructions. In this example, the TAS determines the optimal translator sequence to be the potential optimal translator sequence having machine translators only.

In another embodiment of this example, in case of failure of the selected optimal translator sequence, an alternate translator sequence, comprising one of the other optimal, or near optimal, translator sequences (e.g., the optimal sequence for human or human and machine translators) and all of the first and second next optimal sequences, is selected by the TAS for performing the required translation or portions of the required translation. Thus, the fifth step 250 optionally comprises determining one or more alternate optimal translator sequences of alternate optimal translators from the translator sequences determined in the fourth step 240. The alternate optimal translator sequences are intended for translating between the language of the user and the language of the correspondent if the optimal sequence fails or is not functional.

The sixth step 260 comprises the user requesting teleportation of one or more of the translator avatars to a meeting location (e.g., meeting location 150 of FIG. 1). The sixth step 260 may alternately or additionally comprise the user requesting teleportation of the correspondent avatar to the meeting location. The meeting location may be, for example, a location of the user avatar. The avatars may be requested to be transported or teleported so that the user may interact with the translators in a comfortable manner.

In the case where one or more of the translators are machine translators, the user may request teleportation of the machine translators to the meeting in a manner similar to requesting teleporting of the translator avatars. Teleportation of a machine translator may, for example, comprise teleporting, of a symbol, similar to an avatar of a human but not associated with a human, representative of the machine translator. The symbol, although not representing a human, is referred to herein as a machine translator avatar. The machine translator avatar may be requested to be transported or teleported because it may be desirable to represent the machine translators as avatars so that users may interact with the machine translators in a comfortable manner.

Alternately, teleportation of a machine translator may comprise transporting software comprised by, or associated with, the machine translator to a processor or memory (e.g., a processor or memory of the user) associated with the virtual meeting or the meeting location.

The seventh step 270 comprises teleporting of the one or more translator avatars, or machine translator avatars, to the meeting location. The seventh step 270 may alternately or additionally comprise teleporting of the correspondent avatar to the meeting location. The seventh step may, optionally, further comprise teleporting the user avatar to the meeting location. The teleporting the translator avatars and/or the correspondent avatar may be according to the request made the sixth step 260.

In some cases, a composite avatar may represent more than one translator. For example, a composite avatar may represent two or more of the avatars of two or more translators comprised by the optimal translator sequence. As an example, the TAS may form and/or present the composite avatar to the user. The user may request the composite avatar to teleport to the meeting. Consequently the composite avatar may teleport to the meeting. An example benefit of the composite avatar is that the composite avatar may simplify the meeting, or the perception by the user regarding translation, by the appearance that there are fewer intermediate languages and translators. In one case, a single translator avatar is a composite avatar representing all of the translators in the optimal translator sequence, and presenting the user with the perception that there are no intermediate languages and that the translation is directly between the languages of the user and the correspondent.

The eighth step 280 comprises providing the translation services to the user. The services are provided by, for example, the TAS and/or the translators and according to one or more of the other steps of method 200.

The ninth step 290 comprises receiving payment for the translation services. For example, the user provides the payment to one or more of the translators and/or the TAS. Payment may be in the form of, for example, monetary instruments (e.g., money), goods, services paid, owed or bartered, or a virtual payment in the form of, for example, virtual money, virtual goods, virtual services paid, owed or bartered, or an exchange of items in an inventory of the user avatar. The virtual payment is made and received within the virtual universe.

Figure 3:
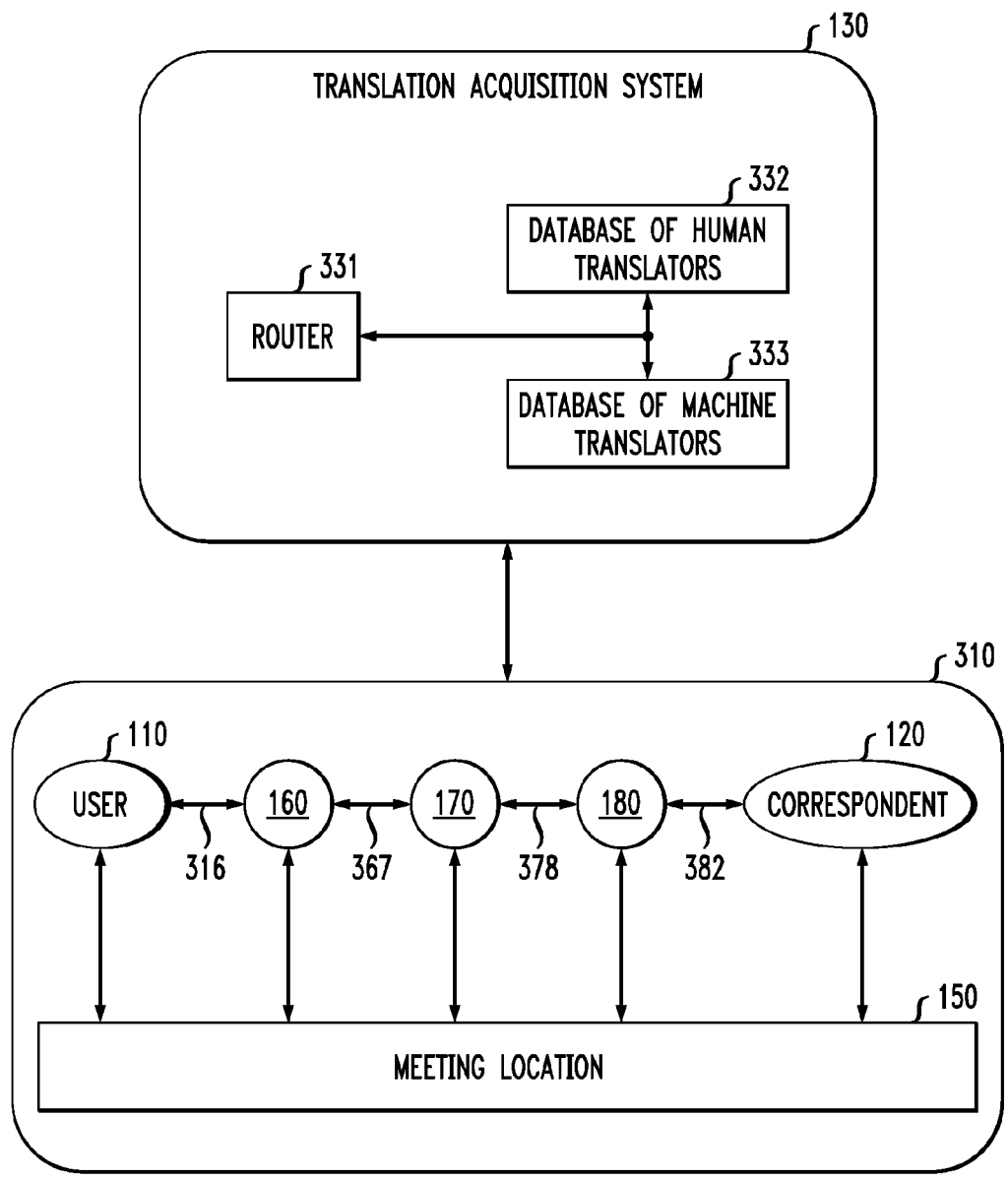
FIG. 3 illustrates a system, comprising databases of translators, for language translation, according to an exemplary embodiment of the invention.

FIG. 3 illustrates a system 300, comprising databases of translators, for language translation in a virtual universe, according to an embodiment of the invention. The system comprises a TAS 130 comprising router 331, a database of translators 332 and a database of machine translators 333. The router 331 may function to determine optimal translator sequences (e.g., the fifth step 250 of method 200). The router 331 may be, for example, the router module or sequence determination module described with respect to the fifth step 250 of method 200. The database of translators 332 and the database of machine translators 333 may be searched by the router to determine one or more translator sequences (e.g., as in the fourth step 240 of method 200).

The system 300 further comprises a sub-system comprising a user 110, a correspondent 120, a first translator 160, a second translator 170, a third translator 180 and a meeting location 150. A first communication link 316 couples the user 110 and the first translator 160, a second communications link 367 couples the first translator 160 and the second translator 170, a third communications link 378 couples the second translator 170 and the third translator 180, and a fourth communication link couples the fourth translator 180 and the correspondent 120. The communications links 316, 367, 378 and 382 may comprise Internet links. The first communications link 316 carries communication in a language of the user. The fourth communications link 382 carries communication in a language of the correspondent. The second communications link 367 carries communication in a common language of the first translator 160 and the second translator 170. The third communications link 378 carries communication in a common language of the second translator 170 and the third translator 180. The communications carried on the second communications link 367 and on the third communications link 378 are translations of either communication originated by the user 110 and carried on the first communications link 316, or communication originated by the correspondent 120 and carried on the fourth communications link 382. An exemplary translator sequence (e.g., the optimal translator sequence determined in the fifth step 250 of method 200) with interconnections is represented by first translator 160, the second communications link 367, the second translator 170, the third communications link 378, and the third translator 180. Links from the user 110, the translators 160, 170 and 180, and the correspondent 120 to the meeting location 150 comprise teleportation paths for virtual teleportation according to methods of the invention (e.g., according to the seventh step 270 of method 200).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIG. 1 through 3, which include a flow diagram or flowchart of the method 200, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-3, can also include, as described herein, providing a system, wherein the system includes distinct modules (e.g., modules comprising software, hardware or software and hardware). By way of example only, the modules may include: a language determination module configured to determine a language of a user and a language of a correspondent; a sequence determination module configured to determine one or more sequences of one or more translators; a selected sequence determination module configured to determine a selected sequence of one or more selected translators from the one or more sequences of the one or more translators; a request module configured to request a change in virtual locations, within a virtual universe, of one or more selected translator virtual representations of the one or more selected translators to a virtual meeting location within the virtual universe; and a location changing module configured to change virtual locations of the one or more selected translator virtual representations to the virtual meeting location. These and other modules may be configured, for example, to perform the steps of method 200 illustrated in FIG. 2.

Figure 4:
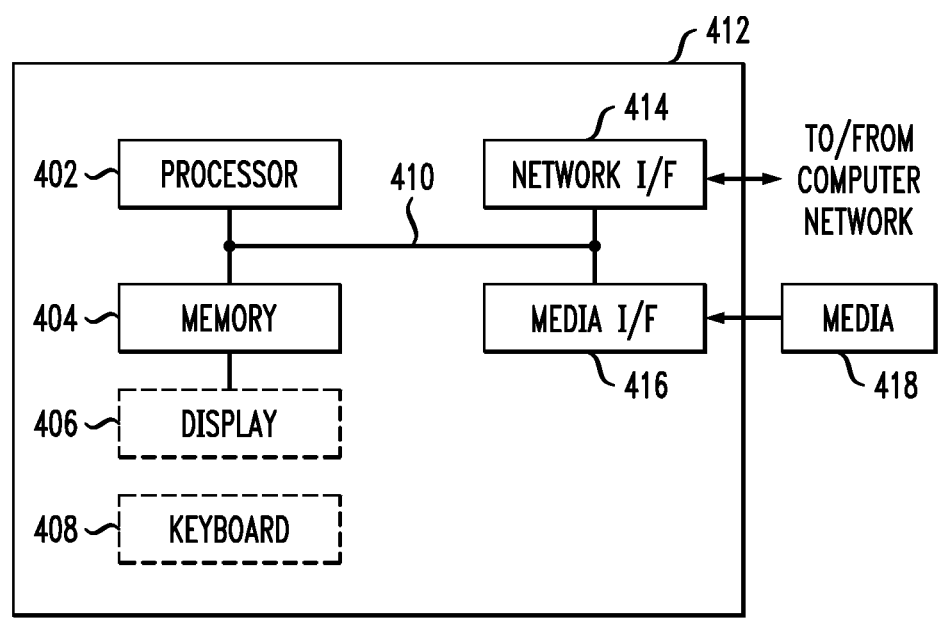
FIG. 4 depicts a computer system that may be useful in implementing one or more aspects and/or elements of the invention.

One or more embodiments can make use of software running on a general purpose computer or workstation. With reference to FIG. 4, such an implementation employs, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 402, memory 404, and input/output interface such as display 406 and keyboard 408 can be interconnected, for example, via bus 410 as part of a data processing unit 412. Suitable interconnections, for example, via bus 410, can also be provided to a network interface 414, such as a network card, which can be provided to interface with a computer network, and to a media interface 416, such as a diskette or CD-ROM drive, which can be provided to interface with media 418.

A data processing system suitable for storing and/or executing program code can include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 408, display 406, pointing device, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, implemented on a processor device, for language translation in a computing environment associated with a virtual application, the method comprising the step of:
   determining a language of a user and a language of a correspondent communicating in a computing environment associated with a virtual application;
   obtaining one or more user-specified constraints from the user, wherein the one or more user-specified constraints are expressed in a constraints equation comprising one or more weights related to the one or more user-specified constraints indicating a relative importance of the user-specified constraints specified in the constraints equation, wherein the constraints equation provides a figure of merit measure;
   determining one or more sequences of one or more translators for translating between the language of the user and the language of the correspondent, wherein determining one or more sequences of one or more translators is performed using the one or more user-specified constraints;
   computing a figure of merit measure for each of the determined sequences of one or more translators using the constraints equation;
   determining an optimal sequence of one or more translators, wherein the optimal sequence is selected from the determined one or more sequences of one or more translators having a greatest figure of merit measure;
   requesting a change in virtual locations, within the computing environment associated with the virtual application, of one or more selected translator virtual representations of the one or more selected translators to a virtual meeting location within the computing environment associated with the virtual application; and
   changing virtual locations of the one or more selected translator virtual representations to the virtual meeting location;
   wherein the steps of determining, obtaining, computing, requesting, and changing are implemented by executing program code by a processor device.

2. The method of claim 1, wherein the step of requesting a change in virtual locations, within a computing environment associated with a virtual application, of one or more selected translator virtual representations to the virtual meeting location comprises requesting teleportation of one or more avatars of the one or more selected translators to the virtual meeting location; and
   wherein the step of changing virtual locations of the one or more selected translator virtual representations to the virtual meeting location comprises teleporting of the one or more avatars of the one or more selected translators to the virtual meeting location.

3. The method of claim 1, wherein the one or more constraints comprise a maximum number of translators in each of the one or more sequences of one or more translators.

4. The method of claim 1, wherein the one or more constraints comprise at least one of: allowing only human translators, allowing only machine translators, allowing both human translators and machine translators, gender of a translator, age of the translator, profession of the translator, location of the translator, relationship of the translator with the user, relationship of the translator with the correspondent, experience of the translator, performance of past translation services by the translator, a voice attribute of the translator, a desired speed of translation, time constraints, and expenditure constraints.

5. The method of claim 1, wherein the one or more user-specified constraints are
   indicated by one or more tags of a virtual representation of the user.

6. The method of claim 1, wherein the step of determining an optimal sequence of one or more translators comprises at least one of:
   (i) determining a number of translators required by each of the one or more sequences, and determining the selected sequence according to the number of translators required by the each of the one or more sequences in order to minimize a number of translators in the selected sequence;
   (ii) determining an expense associated with each of the one or more sequences, and determining the selected sequence according to the expense associated with the each of the one or more sequences in order to minimize an expense of the selected sequence; and
   (iii) determining an accuracy of translation associated with each of the one or more sequences, and determining the selected sequence according to the accuracy of translation of the each of the one or more sequences in order to maximize an accuracy of translation of the selected sequence.

7. The method of claim 1, wherein the step of determining an optimal sequence of one or more translators comprises:
determining a plurality of indicators comprising an indicator for each sequence of the one or more sequences, and determining the selected sequence according to the plurality of indicators;
wherein the indicator for each sequence comprises a measure of at least one of: i) a number of translators required for the each sequence, ii) an expense associated with use of the each sequence, iii) an accuracy of translation for the each sequence, and iv) and a projected translation time for the each sequence.

8. The method of claim 1, wherein one or more translator tags of one or more translator virtual representations of the one or more translators indicate, for the one or more translators, at least one of: i) cost of translation, ii) accuracy of translation, iii) time for translation, iv) speed of translation, and v) a constraint imposed by the one or more translators.

9. The method of claim 1 further comprising the step of:
receiving a virtual payment, within the computing environment associated with the virtual application, from the user to the one or more selected translators.

10. The method of claim 1 further comprising the step of: at least one of:
changing virtual locations of a virtual representation of the correspondent to the virtual meeting location; and
representing the user at the virtual meeting location by a virtual representation of the user.

11. The method of claim 1 further comprising at least one of the steps of:
translating the language of the user to the language of the correspondent by the selected sequence of the one or more selected translators; and
translating the language of the correspondent to the language of the user by the selected sequence of the one or more selected translators.

12. The method of claim 11, wherein at least one of the steps of: i) the translating the language of the user to the language of the correspondent, and ii) the translating the language of the correspondent to the language of the user comprises real-time translation of communication between the user and the correspondent.

13. The method of claim 1, wherein the method provides for communication, within the computing environment associated with the virtual application, between the user and the correspondent occurring through the selected sequence of the one or more selected translators.

14. The method of claim 1, wherein the step of determining a language of the user and a language of the correspondent comprises at least one of: (i) monitoring of communication of the user occurring within the computing environment associated with the virtual application, (ii) monitoring of communication of the correspondent occurring within the computing environment associated with the virtual application, (iii) a language tag of a virtual representation of the user specifying the language of the user, and (iv) a language tag of a virtual representation of the correspondent specifying the language of the correspondent.

15. The method of claim 1, wherein the language of the user and the language of the correspondent differ by at least one of: i) a root language, ii) a dialect, iii) a set of colloquialisms, iv) a set of idioms, and v) a nomenclature; and
wherein the step of determining a language of the user and a language of the correspondent comprises determining at least one of: the root language, the dialect, the set of colloquialisms, the set of idioms, and the nomenclature.

16. The method of claim 1, wherein the step of determining a language of the user and a language of the correspondent comprises determining at least one of: one or more language skills, an accent, a dialect, and a speed of communication.

17. The method of claim 1, wherein one or more tags of a virtual representation of the user specify at least one of: the language of the user, a preferred language of communication for the user, a dialect of the user, experience of the user with a language, a voice attribute of the user, a set of colloquialisms of the user, a set of idioms of the user, and a nomenclature of the user.

18. The method of claim 1, wherein one or more tags of a virtual representation of the correspondent specify at least one of: the language of the correspondent, a preferred language of communication for the correspondent, a dialect of the correspondent, experience of the correspondent with a language, a voice attribute of the correspondent, a set of colloquialisms of the correspondent, a set of idioms of the correspondent, a nomenclature of the correspondent, and a constraint imposed by the correspondent.

19. The method of claim 1 further comprising the steps of:
providing, to the user, information pertaining to the one or more sequences; and
forming, by the user, instructions for determining the selected sequence, wherein the instructions are formed according to the information;
wherein the step of determining a selected sequence is performed according to the instructions.

20. The method of claim 1, wherein the step of determining an optimal sequence of one or more translators comprises:
determining at least one alternate selected sequence of one or more alternate selected translators from the one or more sequences of the one or more translators, wherein the at least one alternate selected sequence is provided for translating between the language of the user and the language of the correspondent if the selected sequence is not functional.

21. The method of claim 1, wherein a composite translator virtual representation represents at least one of: i) two or more translators of the one or more selected translators, and ii) two or more of the one or more selected translator virtual representations;
wherein the step of requesting a change in virtual locations comprises requesting a change in virtual locations of the composite translator virtual representation; and
wherein the step of changing virtual locations comprises changing virtual locations of the composite translator virtual representation.

22. Apparatus for providing language translation in a computing environment associated with a virtual application, the apparatus comprising:
a memory; and
a processor coupled to the memory and configured to:
determine a language of a user and a language of a correspondent communicating in a computing environment associated with a virtual application;
obtain one or more user-specified constraints from the user, wherein the one or more user-specified constraints-are expressed in a constraints equation comprising one or more weights related to the one or more user-specified constraints indicating a relative importance of the user-specified constraints specified in the constraints equation, wherein the constraints equation provides a figure of merit measure;

determine one or more sequences of one or more translators for translating between the language of the user and the language of the correspondent, wherein an operation to determine one or more sequences of one or more translators is performed using the one or more user-specified constraints;

compute a figure of merit measure for each of the determined sequences of one or more translators using the constraints equation;

determine an optimal sequence of one or more translators, wherein the optimal sequence is selected from the determined one or more sequences of one or more translators having a greatest figure of merit measure;

request a change in virtual locations, within the computing environment associated with the virtual application, of one or more selected translator virtual representations of the one or more selected translators to a virtual meeting location within the computing environment associated with the virtual application; and change virtual locations of the one or more selected translator virtual representations to the virtual meeting location.

23. A non-transitory computer readable storage medium embodying computer readable program code which, when executed by a computer, causes the computer to perform method steps of:

determining a language of a user and a language of a correspondent communicating in a computing environment associated with a virtual application;

obtaining one or more user-specified constraints from the user, wherein the one or more user-specified constraints are expressed in a constraints equation comprising one or more weights related to the one or more user-specified constraints indicating a relative importance of the user-specified constraints specified in the constraints equation, wherein the constraints equation provides a figure of merit measure;

determining one or more sequences of one or more translators for translating between the language of the user and the language of the correspondent, wherein determining one or more sequences of one or more translators is performed using the one or more user-specified constraints;

computing a figure of merit measure for each of the determined sequences of one or more translators using the constraints equation;

determining an optimal sequence of one or more translators, wherein the optimal sequence is selected from the determined one or more sequences of one or more translators having a greatest figure of merit measure;

requesting a change in virtual locations, within the computing environment associated with the virtual application, of one or more selected translator virtual representations of the one or more selected translators to a virtual meeting location within the computing environment associated with the virtual application; and changing virtual locations of the one or more selected translator virtual representations to the virtual meeting location.

* * * * *